July 25, 1939.　　　　　E. LAKATOS　　　　　2,167,078
ELECTROMECHANICAL SYSTEM
Filed Nov. 5, 1937　　　　2 Sheets—Sheet 1

INVENTOR
E. LAKATOS
BY
E. V. Griggs
ATTORNEY

July 25, 1939.  E. LAKATOS  2,167,078
ELECTROMECHANICAL SYSTEM
Filed Nov. 5, 1937   2 Sheets-Sheet 2

INVENTOR
E. LAKATOS
BY
E. V. Griggs
ATTORNEY

Patented July 25, 1939

2,167,078

UNITED STATES PATENT OFFICE 2,167,078

ELECTROMECHANICAL SYSTEM

Emory Lakatos, New York, N. Y., assignor to Bell Telephone Laboratories, Incorporated, New York, N. Y., a corporation of New York Application November 5, 1937, Serial No. 172,915

11 Claims. (Cl. 178—44)

This invention relates to electromechanical systems and more particularly to electromechanical systems in which the electromechanical coupling is effected through the motion of a permanently magnetized member.

An object of the invention is to provide an improved electromechanical vibrator for use at low frequencies.

A further object is to provide improved devices for coupling electrical circuits to mechanically vibratory systems.

A further object is to increase the power transmitting capacity of low frequency electromechanical wave filter and vibratory systems.

A further object is to eliminate difficulties resulting from the freezing or sticking of the mechanical vibrating elements to fixed elements in an electromechanical vibrating system.

Other objects and advantages of the invention will become apparent during the course of the following description.

The utility and efficiency of the "moving-coil" type of loud-speaker is well known. The present invention contemplates virtually an inversion of the "moving-coil" system, in that in the system of this invention the coils are fixed and the permanently magnetized element in the field of which the coils are located is supported on resilient members and may be caused to oscillate in response to the passage of alternating currents through the coils.

Because of the relatively large mass which may readily be given to such a magnetized element, the system may conveniently be tuned to mechanical resonance at very low frequencies, for example, frequencies in the order of 10 to 100 cycles per second.

The system of the present invention is entirely free of several of the more serious difficulties encountered with devices of the prior art commonly employed in mechanical filters working at low frequencies. Such devices of the prior art usually employ armatures supported on reed springs. The adjustment of the armatures with respect to the poles of associated stationary magnets is usualy critical. In such devices the amount of travel of the armature within its satisfactory operating range is relatively small so that the quantity of power transmitted through the filter is correspondingly small.

Measures to increase the amount of power which may be transmitted through mechanical fiters of the prior art comprise increasing the mass of the armature and decreasing the stiffness of the armature springs. Difficulties are then encountered with twisting of the supporting springs, even a slight distortion of which throws the entire filter out of adjustment and destroys its selective properties.

Another serious difficulty is the sticking or freezing of the armature on the stationary magnet pole-pieces, which obviously incapacitates the filter.

With the moving magnet system of this invention, a moving mass of relatively large magnitude may readily be employed, supporting springs having a greater stiffness are required to produce mechanical resonance at a given frequency and these springs are not easily twisted or distorted. Critical adjustments are not necessary. A large travel of the moving mass is easily obtained and relatively large amounts of power may be transmitted by the system. Difficulties with the sticking or freezing of armatures are entirely avoided.

The invention may be more readily understood from the following detailed description in connection with the accompanying drawings in which.

Figure 1:
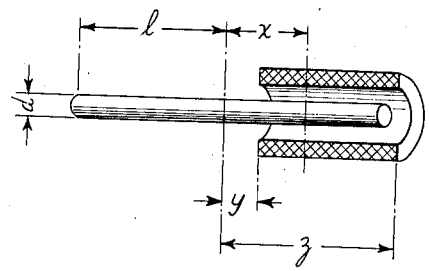
Fig. 1 shows a diagram employed in explaining design principles involved in constructing devices of this invention.

The principles underlying the determination of the dimensions and characteristics of the permanently magnetized member and the associated electrical coils are as follows: Assume as illustrated in Fig. 1 a bar magnet 16 of length $2l$ and diameter $d$ coaxial with a coil 17 wound with $n$ turns per centimeter. The coil 17 extends from a point $y$ centimeters from the center of the magnet to a point $z$ which, for the sake of generality, may be taken as extending beyond the end of the magnet.

Let $\phi_0$ be the flux passing through the cross-section of the magnet at $x=0$ and $\phi$ the flux at a section taken at $x$. In the interval $y \leq x \leq z$ the flux emerging at $x$ links $n(x-y)$ turns. From $z \leq x \leq \infty$, the flux links $n(z-y)$ turns. The flux linkage $M$ is therefore given by the equation $$M = -n \int_y^z (x-y) \frac{d\varphi}{dx} dx - n \int_z^\infty (z-y) \frac{d\varphi}{dx} dx \quad (1)$$

since the flux leaking out over an interval $dx$ is $$-\frac{d\varphi}{dx} dx$$

Since for $x=\infty$, $\phi=0$, the above equation when integrated reduces to $$M = n \int_y^z \varphi \, dx \quad (2)$$

The force factor is the derivative of the flux linkage with respect to the longitudinal displacement of the magnet. Designate this displacement by the variable $q$. Then $$G = \frac{\partial M}{\partial q} = n(\varphi_z - \varphi_y) \quad (3)$$

From this it appears that the force factor depends only on the turns per centimeter and the difference in the fluxes at the ends of the coil.

The criterion of performance of an electromechanical vibrating system whose inductive reactance is negligible may be taken as $$\frac{G^2}{mR}$$

Here $m$ is the effective mass of the moving system, $G$ the force factor and $R$ the effective resistance of the coil. At low frequencies, this resistance $R$ does not differ appreciably from the direct current resistance of the winding.

Figure 2:
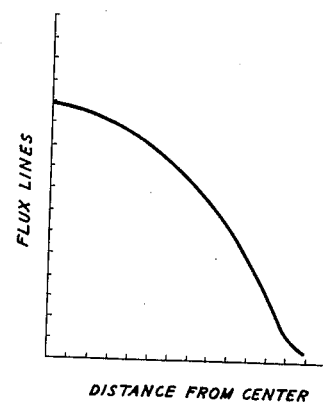
Fig. 2 shows a typical flux distribution curve for a permanently magnetized bar.

A typical curve of flux distribution throughout the length of a permanent magnet is shown in Fig. 2.

The curve is very nearly a parabola, the flux at the end being about 12 per cent of the flux at the center. Beyond the end of the magnet, the flux drops to a very small value in a short interval.

Hence if $\varphi_0$ is the flux at the center of the magnet, the variation of the flux along the length can be expressed to a reasonable degree of accuracy as $$\phi = \phi_0 \left[ 1 - \frac{7}{8} \left( \frac{x}{l} \right)^2 \right] \quad (4)$$

The effective mass of the magnet is:

$$m = \frac{\pi}{2} d^2 \rho l \quad (5)$$

where $l$ is half the length of the magnet, $d$ is the diameter of the magnet, $\rho$ is the density of the magnet material.

To determine the optimum dimensions of the magnet, it is not necessary to write out the complete expression for the direct current resistance of the coil. It is sufficient to observe that this resistance is proportional to $n^2(z-y)$. That is $$R = C n^2 (z-y) \quad (6)$$

The factor $C$ is a constant, the magnitude of which depends upon the wire size, space factor, resistivity and mean turn of the coil, and may readily be determined by conventional methods for any particular type of coil construction. In general, for reasonable efficiency and close coupling with the mechanical system, the coil diameter should not exceed three times that of the bar magnet and for low impedances a favorable space factor for the winding may be more easily obtained using ribbon wire of rectangular cross-section.

By combining Equations 3, 5 and 6, it is found that $$\frac{G^2}{mR} = \frac{2(\phi_z - \phi_y)^2}{\pi C (z-y) d^2 \rho l} \quad (7)$$

First, the optimum value of $$\frac{(\phi_z - \phi_y)^2}{z-y}$$

should be determined.

Using Equation 4, this becomes $$\frac{49}{64} \frac{\phi_0^2}{l^4} \cdot \frac{(z^2-y^2)^2}{z-y} = \frac{49}{64} \frac{\phi_0^2}{l^4} (z-y)(z+y)^2 \quad (8)$$

Holding $z$ fixed and varying $y$, it is found that $$y = \frac{z}{3}$$

for optimum value. Obviously, $z$ itself should be as large as possible. That is, $$z = l, \quad y = \frac{l}{3} \quad (9)$$

The physical significance of this result is that the coils should cover the outer two-thirds of the magnet. Using the above found values for $z$ and $y$, the above expression reduces to $$\frac{49}{64} \phi_0^2 \times \frac{32}{27} \cdot \frac{1}{l} = \frac{49}{54} \frac{\phi_0^2}{l} \quad (10)$$

The value of $$\frac{G^2}{mR}$$

then becomes $$\frac{G^2}{mR} = \frac{49}{27 \pi C} \frac{\phi_0^2}{\rho d^2 l^2} \quad (11)$$

The final step is to obtain the best value of $$\frac{\phi_0^2}{\rho d^2 l^2}$$

Figure 3:
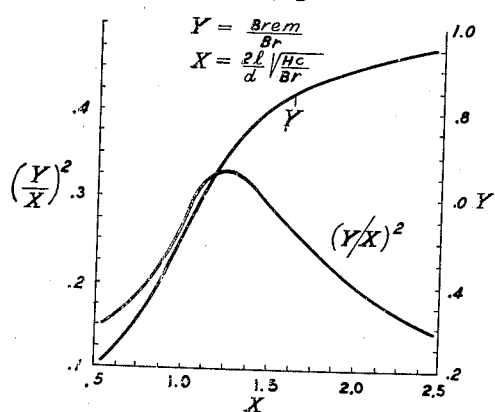
Fig. 3 illustrates in graphic form the relations existing between the physical dimensions and the properties of the magnetized member, and the effective coupling of the system of this invention.

This can best be done by reference to curve Y, shown in Fig. 3.

This curve was first obtained by K. L. Scott, Transactions of A. I. E. E. vol. 51, page 410, June 1932, who showed that the remanence flux of all magnet materials can be obtained from it. The curve itself is of a universal nature, showing the value of $$\frac{B_{rem}}{B_r}$$

plotted against $$\frac{2l}{d} \sqrt{\frac{H_c}{B_r}}$$

Here $B_{rem}$ is the remanence flux density at the center of the magnet, $B_r$ is the residual flux density at the center of an indefinitely long magnet of the same material, $H_c$ the coercive force, $2l$ the actual length of the magnet, $d$ the actual diameter of the magnet.

Defining $$X \equiv \frac{2l}{d} \sqrt{\frac{H_c}{B_r}} \quad (12)$$

and $$Y \equiv \frac{B_{rem}}{B_r} \quad (13)$$

we can write $$\phi_0 = \frac{\pi d^2}{4} Y B_r \quad (14)$$

Substituting Equation 14 into 11, we get $$\frac{G^2}{mR} = \frac{49\pi}{108c\rho} \frac{Y^2 B_r H_c}{\left(\frac{2l}{d}\right)^2 \frac{H_c}{B_r}} = \frac{49\pi}{108c\rho} \frac{Y^2}{X^2} B_r H_c \quad (15)$$

The function $$\frac{Y^2}{X^2}$$

is also shown in Fig. 2. Its optimum value is 0.330 and occurs at a value X=1.25.

The design is now completely established. The properties of various types of magnet materials are given by W. C. Ellis and E. E. Schumacher in the Bell System Technical Journal for January 1935 at page 8. That material for which the ratio $$\frac{B_r H_c}{\rho}$$

that is the energy per gram, is the greatest should obviously be chosen.

Having selected the material, the optimum value of $$\frac{2l}{d}$$

is found from the definition of X and that the optimum value of X is 1.25. Apparently the actual dimensions of the magnet make no difference in the efficiency of the device as long as $$\frac{2l}{d}$$

has the optimum value. Finally, each coil is made one-third the length of the bar magnet, and the coils are so placed over the magnet that the central third is not covered.

Figure 4:
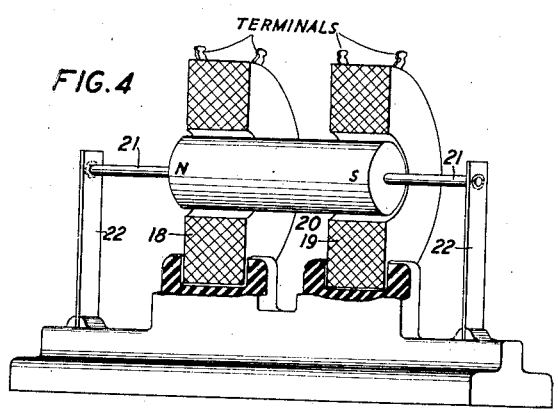
Fig. 4 illustrates in diagrammatic form the moving magnet system of this invention.

The actual value of the mass of the magnetized member and the stiffness of the springs supporting it are determined in accordance with principles well known to the art, to produce mechanical resonance at the desired frequency. Fig. 4 represents in diagrammatic form one embodiment of this invention and comprises vibrating magnet 20, electrical coils 18 and 19, supporting springs 22 and non-magnetic pins 21. A single supporting spring holding the magnet at its center point could be employed, if desired, but would not be as stable as the arrangement shown in Fig. 4.

Figure 5:
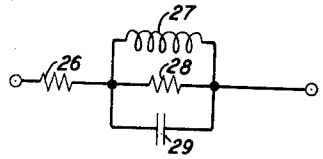
Fig. 5 illustrates in schematic form the equivalent two-terminal electrical impedance of the system of Fig. 4.

At the low operating frequencies contemplated for the system of this invention, the "damped" inductance of the electrical coils and the mutual inductance between them will be negligible for most practical purposes so that the equivalent all-electrical network of the device of this invention may be represented as shown in Fig. 5. Because of the reversed polarity of the ends of the magnet, the coils should be connected electrically in series opposing when employed cooperatively in a common circuit.

Fig. 5 is the representation familiar to the art of electromechanical devices of this general class except that no series inductance is included for the reason above mentioned. Fig. 5 comprises the series resistance 26, which is essentially the direct current resistance of the coils of the device, and the anti-resonant combination of inductance 27 and capacity 29 shunted by resistance 28. The electrical anti-resonance results, as is well known to the art, from the mechanical resonance of the vibrating system and the resistance 28 represents the dissipation of energy by said vibrating system. At low frequencies the effects of eddy current may also be neglected. If employed at higher frequencies, the vibrating member may be laminated and the laminations bound together in accordance with the principles disclosed in my copending application Serial No. 133,837, filed March 30, 1937. The damped inductance of the device should also be taken into account at higher frequencies.

Figure 6:
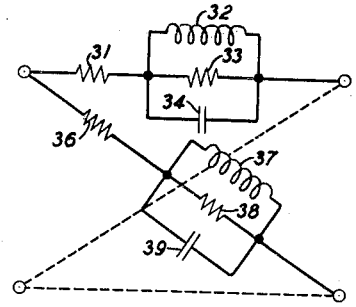
Fig. 6 is illustrative of one method of employing devices of the type shown in Fig. 4 in a lattice type filter.

Two devices as shown in Fig. 4 may obviously be arranged to constitute a lattice type filter as shown in Fig. 6, the two coils of one device comprising the two series arms of the lattice and the two coils of the other device comprising the two lattice arms, respectively, the electrical impedances of the two devices being proportioned in accordance with well-known principles so that the combination will have the characteristics of a wave filter transmitting a particular band of frequencies.

Figure 7:
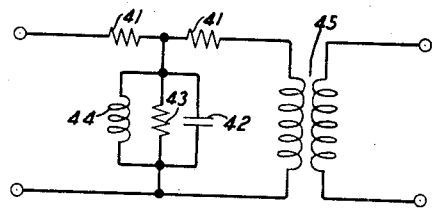
Fig. 7 shows another form of network, the electrical characteristics of which may be simulated by the device of Fig. 4.

In Fig. 7 another electrical network which the device of this invention may simulate is shown. This network effectively results when one coil of the device of this invention is employed as the input circuit and the other as the output circuit of the device. Resistances 41 represent the direct current resistances of the coils, and the parallel combination of capacity 42 and inductance 44 shunted by resistance 43 represents the resonance of the vibrating system as damped by the energy dissipation occurring therein. Transformer 45 indicates that an impedance transformation may be obtained by winding different numbers of turns on the input and output coils of the device respectively.

Figure 8:
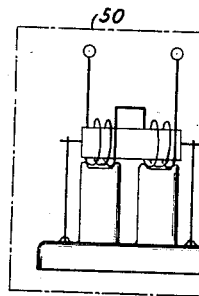
Fig. 8 shows in diagrammatic form an electromechanical filter employing devices of the type shown in Fig. 4 to obtain the transformation from electrical to mechanical energy at one end of the filter and from mechanical to electrical energy at the other end of the filter.
Figure 9:
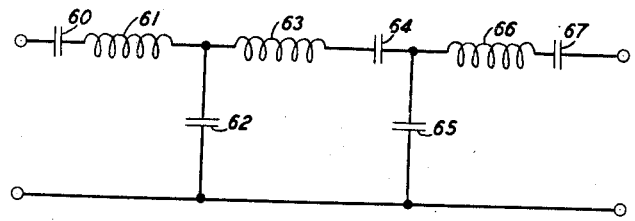
Fig. 9 shows in schematic form the equivalent electrical network of the arrangement indicated in Fig. 8.

Fig. 8 illustrates further advantageous uses of the device of this invention and comprises a device of this invention, 50, employed to drive a chain of elements comprising springs 51, 53 and 54 and mass 52 which in turn activate the vibrating system of a second device of this invention, 55. The complete system is, of course, designed in accordance with well-known principles, as a wave transmission system equivalent to an electrical wave filter and may have, for example, impedance, phase and transmission properties equivalent to those of an electrical network indicated by the schematic shown in Fig. 9. A conversion from electrical to mechanical energy, the attenuation of a plurality of mechanical filter sections, a conversion back to electrical energy and, if desired, an impedance transformation may readily be obtained by designing the combination of Fig. 8 in accordance with well-known principles.

Many other applications and modifications within the spirit and scope of the invention will occur to persons skilled in the art and no effort has here been made to be exhaustive.

What is claimed is:

1. In combination, a permanently magnetized rod, a spring support therefor, said support permitting oscillation of said rod along its longitudinal axis, an electrical coil concentric with and mechanically free of said rod, the length of said coil being one-third the length of said rod, said coil being located toward one end of said rod, the outer end of said coil being in the same plane as the near end of said rod when said rod is in its position of rest.

2. An electromechanical system comprising a permanently magnetized bar, a spring support for said bar, the stiffness of said spring support and the mass of said bar being proportioned so that the combination will oscillate mechanically in resonance at a particular frequency, the bar moving longitudinally, two fixed electrical coils concentric with and mechanically free of said bar, each coil being approximately one-third the length of said bar, said coils being positioned in relation to the respective ends of said bar in its position of rest so that the outer third of the bar at each end thereof will be encircled by one of the coils.

3. An electromechanical system including an electrical coil, a permanently magnetized cylindrical rod, a resilient support for said rod, said support permitting longitudinal oscillation of said rod about its position of rest, said rod being coupled electromagnetically with said electrical coil, the ratio of length to diameter of said rod being approximately 1.25 divided by $$\sqrt{\frac{H_c}{B_r}}$$

4. In combination, an electrical coil, a permanently magnetized cylindraceous bar, a resilient support for said bar, said support permitting longitudinal oscillation of said bar about its position of rest, said bar being coupled electromagnetically with said electrical coil, the ratio of length to thickness of said bar being approximately 1.25 divided by $$\sqrt{\frac{H_c}{B_r}}$$

5. The combination of claim 4, the material of the bar of said combination being selected to have the maximum energy per gram as expressed by the ratio $$\frac{B_r H_c}{\rho}$$

6. An electromechanical filter comprising a permanently magnetized bar supported on springs, the mass of the bar and the resilience of the springs being so proportioned that the combination will be mechanically resonant at a particular frequency, two electrical coils fixed in such positions as to encircle the two ends of the bar respectively when said bar is at rest, said coils clearing said bar sufficiently and said springs supporting said bar so as to permit mechanical vibration of the bar along its longitudinal axis, one of said coils serving as an input circuit and the other of said coils serving as the output circuit of said filter, the input and output coils each being approximately one-third the length of the magnetized bar.

7. An electromechanical filter comprising a permanently magnetized bar supported on springs, the mass of the bar and the resilience of the springs being so proportioned that the combination will be mechanically resonant at a particular frequency, two electrical coils fixed in such positions as to encircle the two ends of the bar respectively when said bar is at rest, said coils clearing said bar sufficiently and said springs supporting said bar so as to permit mechanical vibration of the bar along its longitudinal axis, one of said coils serving as an input circuit and the other of said coils serving as the output circuit of said filter, the input and output coils each covering approximately the outer third of the bar at their respective ends when the bar is in its position of rest.

8. A device for converting electrical to mechanical energy and mechanical to electrical energy comprising a permanently magnetized bar supported by resilient means, the mass of the bar and the resilience of the supporting means being so proportioned that the combination will be mechanically resonant at a particular frequency, two electrical coils fixed in such positions as to encircle the two ends of the bar respectively when said bar is at rest, and to permit free oscillation of said bar and said supporting means, said coils being connected in series opposing, the two coils each being approximately one-third the length of the magnetized bar.

9. A device for converting electrical to mechanical energy and mechanical to electrical energy comprising a permanently magnetized bar supported by resilient means, the mass of the bar and the resilience of the supporting means being so proportioned that the combination will be mechanically resonant at a particular frequency, two electrical coils fixed in such positions as to encircle the two ends of the bar respectively when said bar is at rest, and to permit free oscillation of said bar and said supporting means, said coils being connected in series opposing, the two coils each covering approximately the outer third of the bar at their respective ends when the bar is in its position of rest.

10. A device for converting electrical to mechanical energy and mechanical to electrical energy comprising a permanently magnetized bar supported by resilient means the mass of the bar and the resilience of the supporting means being so proportioned that the combination will be mechanically resonant at a particular frequency, two electrical coils fixed in such positions as to encircle the two ends of the bar respectively when said bar is at rest, and to permit free oscillation of said bar and said supporting means, said coils being connected in series opposing, the material of the bar of said device being selected to have the maximum energy per gram as expressed by the ratio $$\frac{B_r H_c}{\rho}$$

11. A device for converting electrical to mechanical energy and mechanical to electrical energy comprising a permanently magnetized bar supported by resilient means the mass of the bar and the resilience of the supporting means being so proportioned that the combination will be mechanically resonant at a particular frequency, two electrical coils fixed in such positions as to encircle the two ends of the bar respectively when said bar is at rest, and to permit free oscillation of said bar and said supporting means, said coils being connected in series opposing, the ratio of length to thickness of the bar of said device being approximately 1.25 divided by $$\sqrt{\frac{H_c}{B_r}}$$

EMORY LAKATOS.